United States Patent [19]
Shorey

[11] Patent Number: 6,007,026
[45] Date of Patent: Dec. 28, 1999

[54] QUICK INSTALLATION-REMOVAL THERMAL INSULATION BLANKET FOR SPACE CRAFT

[75] Inventor: Mark W. Shorey, Des Moines, Wash.

[73] Assignee: The Boeing Company, Seattle, Wash.

[21] Appl. No.: 08/885,599

[22] Filed: Jun. 30, 1997

[51] Int. Cl.[6] .................................................. B64G 1/50
[52] U.S. Cl. ..................... 244/158 A; 244/119
[58] Field of Search ................................ 244/117 R, 119, 244/158 A, 118.5; 52/404.1, 404.2, 406.1, 406.3, 406.2

[56] References Cited

U.S. PATENT DOCUMENTS

| | | |
|---|---|---|
| 4,456,208 | 6/1984 | MacConochie et al. . |
| 4,919,366 | 4/1990 | Cormier . |
| 4,925,134 | 5/1990 | Keller et al. . |
| 5,154,373 | 10/1992 | Scott . |
| 5,178,922 | 1/1993 | Ferrier et al. . |
| 5,330,124 | 7/1994 | Le Touche . |
| 5,421,133 | 6/1995 | Berdan et al. . |
| 5,489,074 | 2/1996 | Arnold et al. . |
| 5,511,747 | 4/1996 | Parrot et al. . |
| 5,545,273 | 8/1996 | Rasky et al. . |
| 5,759,659 | 6/1998 | Sanocki et al. . |
| 5,839,696 | 11/1998 | Caplin et al. . |

FOREIGN PATENT DOCUMENTS

| | | |
|---|---|---|
| 617283 | 4/1991 | Australia . |
| 2 609 276 | 7/1988 | France . |
| 172871 | 1/1922 | United Kingdom . |
| WO 93/21061 | 10/1993 | WIPO . |

*Primary Examiner*—Peter M. Poon
*Assistant Examiner*—Tien Dinh
*Attorney, Agent, or Firm*—Conrad O. Gardner

[57] ABSTRACT

A system for removably mounting a thermal insulation blanket to a structure such as a launch vehicle exterior surface, includes a blanket formed of a layer of batting with a substantially rigid frame positioned against one side, and a cover (preferably fabric) surrounding the batting layer. The cover holds the frame in place on the surface of the batting. Preferably, the blanket is quilted. For space launch applications, the batting, cover, and quilting thread are ceramic fiber materials suitable for high temperature use. Fasteners are mounted on the frame and extend outward from the cover. Corresponding mating fasteners are mounted on the structure in an arrangement so as to be positioned to engage with the fasteners extending from the blanket cover. A flat or curved blanket can be provided with a frame material that can be shaped to the desired curve.

8 Claims, 4 Drawing Sheets

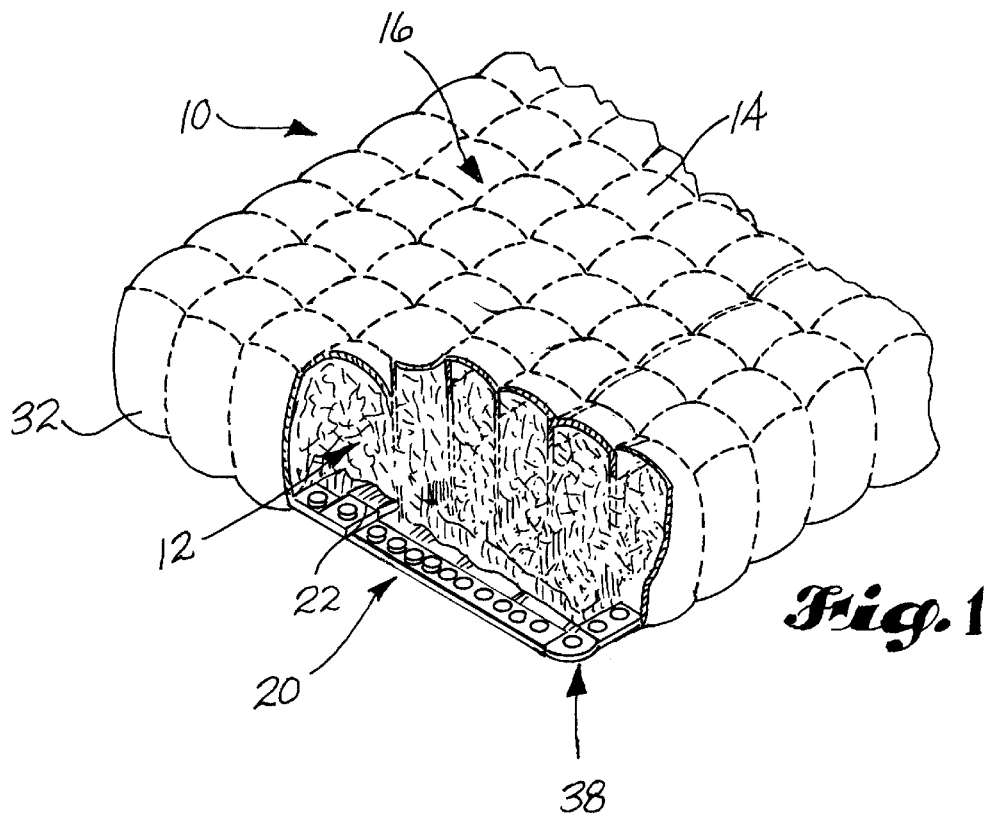
Fig. 1
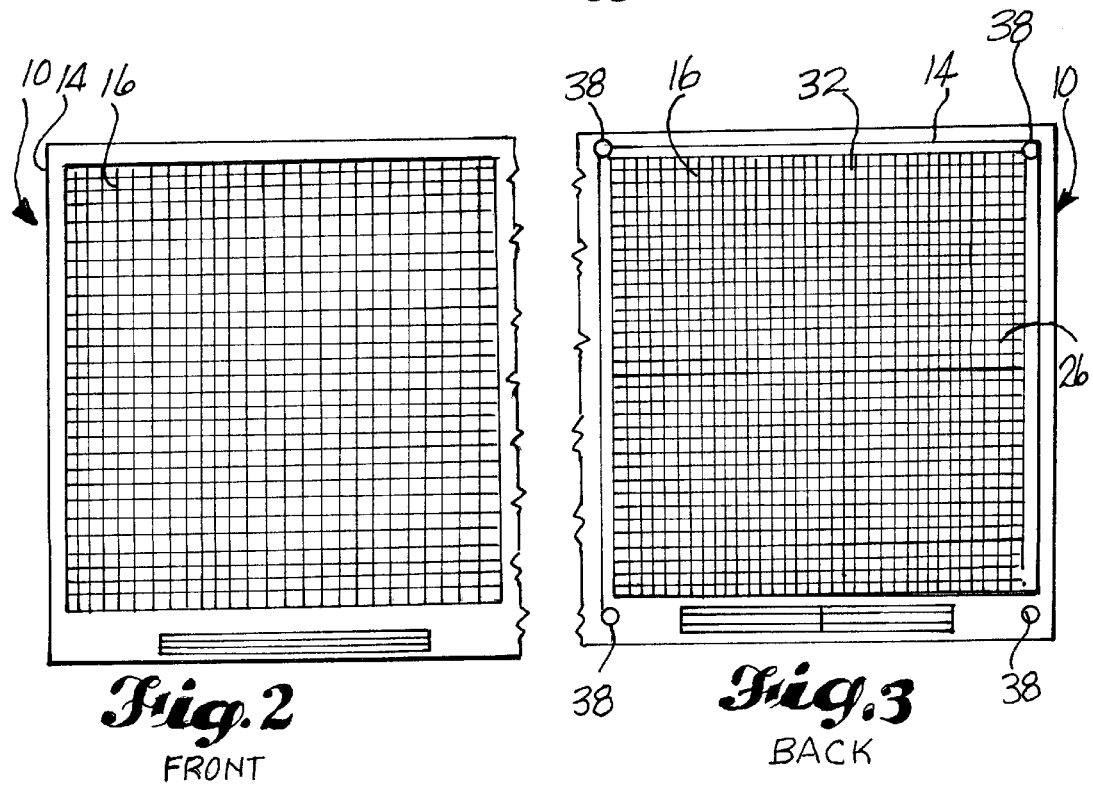
Fig. 2 FRONT
Fig. 3 BACK

QUICK INSTALLATION-REMOVAL THERMAL INSULATION BLANKET FOR SPACE CRAFT

BACKGROUND OF THE INVENTION

1. Field of the Invention

This invention relates to the field of thermal insulation blankets, and more particularly to thermal protection for spacecraft.

2. Background Information

Reusable space launch vehicles such as the Space Shuttle need thermal insulation to protect the vehicle from heat during reentry. Currently, flexible quilted ceramic blankets are used to cover a portion of the exterior of such vehicles for heat protection. The flexible blankets usually are on the order of a few feet in length. They are constructed of a ceramic fiber batting surrounded by a ceramic fabric cover material, which is quilted with ceramic thread to form a blanket on the order of an inch or two thick. These are typically mounted on the vehicle exterior by silicon rubber adhesive. Blankets adhered to a structure by adhesive often do not withstand high acoustic loads, on the order of 165 dB, for example. Acoustic loads of this magnitude often cause the quilting threads to break, and the batting to separate and puff up. This reduces the performance of the insulating blanket to unacceptable levels.

The blankets often must be removed and replaced for inspection and repair. The process of installing and removing the blankets is time-consuming and expensive. Turn-around time for reusable launch vehicles will be increasingly critical to their success, and the time involved in removal and replacement of insulation blankets mounted with adhesive will be an obstacle to achieving goals for turn around time for future reusable launch vehicles.

What is needed, then, is a means for quick installation and remove of flexible blankets, which requires very little skill to ensure complete and safe mounting, with minimal room for human error, and in a manner which will allow the blanket to withstand the extreme acoustic loads to which it will be subjected during launch.

SUMMARY OF THE INVENTION

In one embodiment, the invention is a system for removably mounting a thermal insulation blanket to a structure such as a launch vehicle exterior surface. The blanket is formed of a layer of batting with a substantially rigid frame positioned against one side, and a cover (preferably fabric) surrounding the batting layer. The cover is configured so as to hold the frame in place on the surface of the batting. Preferably, the blanket is quilted. For space launch applications, the batting , cover, and quilting thread are ceramic fiber materials suitable for high temperature use.

Releasable fasteners are mounted on the frame and extend through the cover. Corresponding mating fasteners are mounted on the structure in an arrangement so as to be positioned to engage with the fasteners extending from the blanket cover. A flat or curved blanket can be provided with a frame material that can be shaped to the desired curve.

A blanket made according to the invention can be quickly installed and removed by a worker having little or no specialized skill. It stays securely fastened under the acoustic loads of rocket launch. The blanket is better able to withstand the acoustic load than with the currently used method of mounting with adhesive, since the frame and mechanical fasteners allow for some movement of the blanket during the acoustic loading, which dissipates the deleterious effects of the loading.

BRIEF DESCRIPTION OF THE DRAWING(S)

FIG. 1 is a perspective view, partially cut away of a first embodiment of the invention.

FIG. 2 is a top plan view of a second embodiment of the invention.

FIG. 3 is a bottom plan view of the FIG. 2 embodiment.

DESCRIPTION OF A PREFERRED EMBODIMENT

Figure 4:
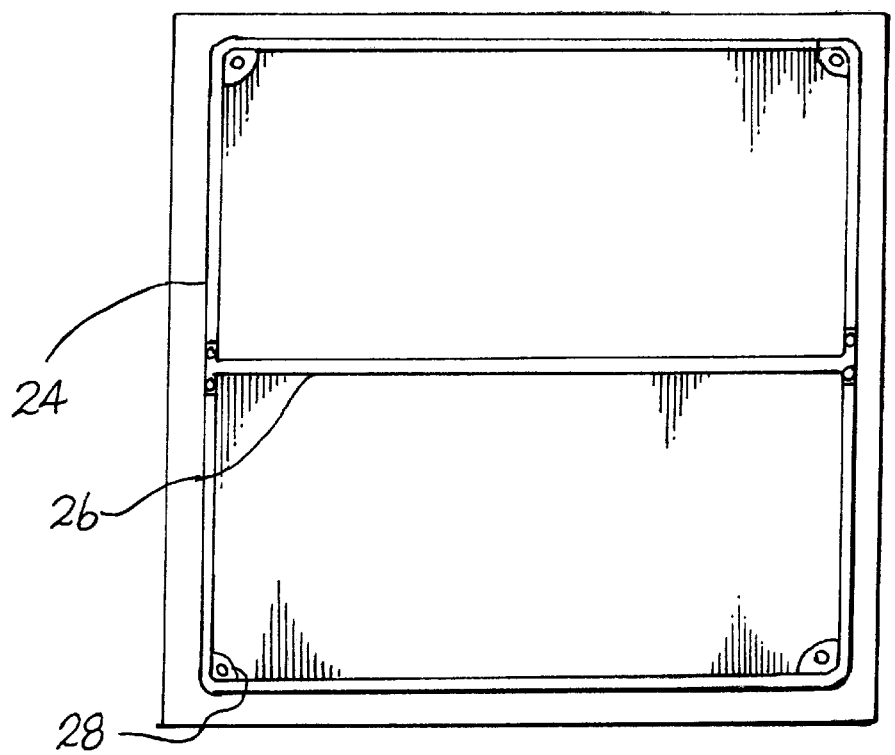
FIG. 4 is a detail of the frame of the FIG. 2 embodiment.
Figure 5:
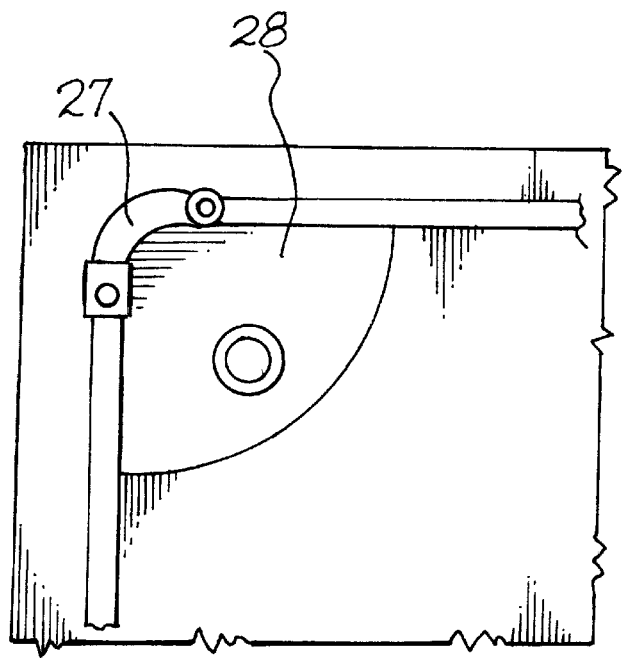
FIG. 5 is a detail of the corner of the FIG. 4 frame.

For purposes of illustration, a flat rectangular blanket about two feet square and about an inch thick is shown, although blankets of any size can be made in accordance with the invention. The illustrated embodiment is particularly suitable for launch vehicle use, although blankets constructed according to the invention can be made for any insulating application, with appropriate choice of materials. For example, blankets according to the present invention could be used in industrial applications, such as those involved with furnaces or kilns, or to insulate the interior of commercial aircraft.

Referring to the Figures, an insulating blanket 10 according to a preferred embodiment of the invention is suitable for use as advanced flexible reusable surface insulation (AFRSI) on a reusable launch vehicle. For launch vehicle use, the materials used are chosen for high heat resistance and low weight. The blanket 10 preferably is made of a low density ceramic batting 12 of a material such as silica or alumina. Such a batting is available commercially, for example the batting sold under the trade name SAFFIL by ICI. A cover 14 made of a ceramic woven material such as that sold by 3M Corporation under the trade name NEXTEL 312 or NEXTEL 440 is disposed around the batting 12. The blanket 10 is quilted or stitched together with ceramic thread 16 such as NEXTEL 440 sewing thread (also available from 3M Corporation). In the illustrated embodiment, a square quilting pattern is used.

Referring to FIG. 1, a frame 20 is disposed along the bottom of the batting 12 in proxrmity to the perimeter of the blanket 10. If the overall size of the blanket 10 is large enough to require additional support, a cross-brace 22 across the width of the frame 20 may be provided.

The frame 20 shown in FIG. 1 is constructed of tubing with a rectangular cross section. FIGS. 2–8 show a preferred embodiment of the frame 24, in which 0.25 inch circular cross-section hollow titanium tubing is used. Titanium is preferable for its light weight and ability to withstand high temperatures. Framing cross section and tubing wall thickness is preferably chosen for the desired heating and stiffness characteristics. A larger cross section provides more stiffness but displaces more batting. The 0.25 inch circular tube size is advantageous for launch vehicle use because it allows for sufficient stiffness while not displacing so much batting as to cause undesirable excessive heating of the frame. FIG. 4 shows the frame 24 with a cross brace 26. Right angle plates 28 are secured to the tubing at elbows 27 forming the frame corners by welding, riveting or other means, to hold the frame in the desired shape. The cross bar 26 is secured in tees (not shown) with similar corner plates. Stainless steel tubing elbows, tees and corner plates are acceptable for launch vehicle use.

Figure 6:
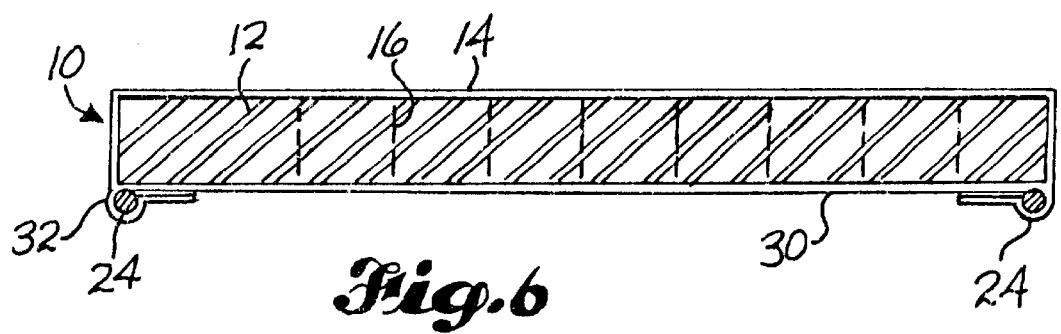
FIG. 6 is a cross section of the FIG. 2 embodiment.

The frame 24 can be secured on the blanket 10 under the cover 14 in a variety of ways. A row of stitching along side the frame elements will assist in holding it in place. FIG. 6 shows an embodiment where the frame 24 is place on the surface of the cover sheet 30 which covers the bottom of the blanket 10. The side portions 32 of the cover 14 are then lapped over the frame 24 and sewn to the bottom sheet 30, preferably with the same type of thread used for the quilting.

Figure 7:
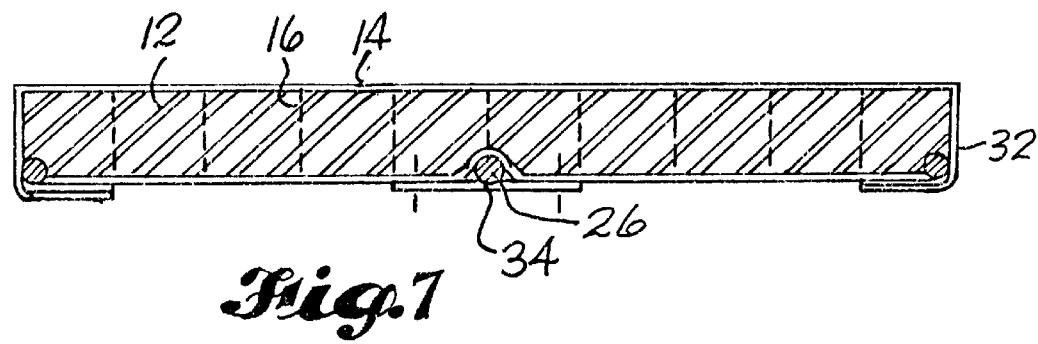
FIG. 7 is a cross section of the FIG. 2 embodiment, showing an alternative for placement and covering of the frame.
Figure 8:
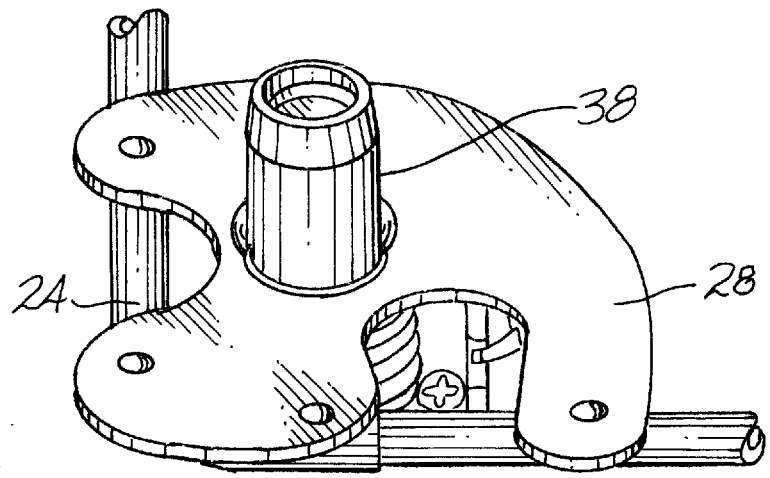
FIG. 8 is a detail of the corner of the FIG. 4 frame adapted for use with a quick release fastener.

FIG. 7 shows an embodiment where the frame 24 is recessed within the batting 12, with the side portions 32 of the cover 14 being lapped around to cover the perimeter of the frame. Where a cross brace 26 is provided, it can be covered by a separate strip 34 of cover fabric, to avoid abrasion or undesirable heating effects, were it in direct contact with the structure to which the blanket will be mounted. The FIG. 7 embodiment is advantageous because a substantially flat bottom surface, with the frame 24 flush with the bottom surface, is provided. In launch vehicle use, this improved the resistance to flutter and reduces the possibility of gas flow between the blanket and vehicle surface.

Figure 9:
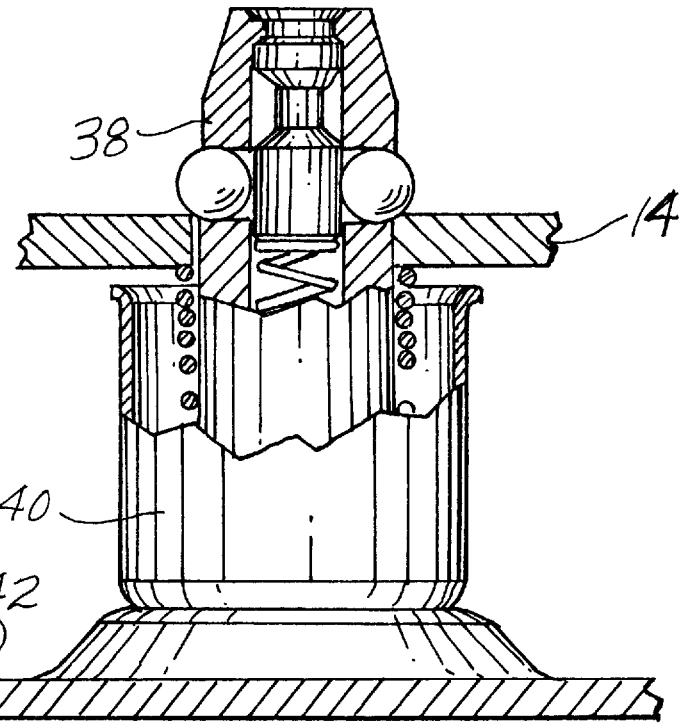
FIG. 9 is a partial cross section of the blanket mounted to a structure.

To removably mount the blanket 10 to a structure, any of a variety of releasable fasteners, such as fabric snaps, hook-and-loop fasteners, or other quick-release fasteners can be used, as long as the materials are compatible with the temperature environment in which they will be used, and with the desired performance characteristics. The quick-release fasteners 38 (see FIGS. 8 and 9) sold by the Fairchild Company are thought to be preferable for launch vehicle use because of their secure fastening mechanism, the ease with which an installer can tell if they are fully engaged (due to an audible click and tactile feedback), and the speed with which they can be released when desired. These fasteners 38 can be fabricated of titanium, which is the preferred material for launch vehicle use.

The fasteners 38 are preferably mounted to the corner plates of the frame 24, in the corner bracket 28. Corresponding mating fasteners 40 are mounted on the launch vehicle exterior 42, positioned to engage with the fasteners 38 in the frames. If a secure mounting requires additional fasteners, they can be provided anywhere elsewhere along the frame.

A flat rectangular frame and blanket has been shown for illustrative purposes. However, a curved frame and blanket can be provided. The Fairchild quick-release fasteners work in acceptable fashion with blankets curved as may be needed for some areas on the surface of a launch vehicle. Non-rectangular shapes are possible with appropriate structural modifications to the frame and frame corner hardware.

Although the invention has been described above with respect to certain specific embodiments, the scope of the invention is not limited to the specific embodiments disclosed. Other designs within the spirit and scope of the invention will be apparent to those skilled in the field after receiving the above teachings. The scope of the invention, therefore, is defined by reference to the following claims.

What is claimed is:

1. A system for mounting a thermal insulation blanket to a structure wherein the blanket comprises:

a batting layer;

a substantially rigid frame positioned against the side of the batting layer which is adjacent the structure when the blanket is mounted thereto;

a cover surrounding said batting layer and said frame;

fasteners mounted on said frame and extending from said cover;

and further comprising mating fasteners mounted on said structure in an arrangement so as to be positioned to engage with said fasteners extending from said cover.

2. The blanket of claim 1 wherein said frame comprises titanium tubing.

3. The blanket of claim 1 wherein said cover includes a woven ceramic material.

4. The blanket of claim 3 wherein said frame is recessed within said batting layer.

5. The blanket of claim 3 wherein said blanket is substantially rectangular, and the fasteners include fasteners mounted near the corners of said frame.

6. The blanket of claim 5 further comprising a cross brace joining two opposing sides of said frame.

7. The blanket of claim 6 wherein said fasteners include quick-release fasteners.

8. A thermal insulation blanket adapted for removable mounting to a structure comprising:

a batting layer;

a substantially rigid frame positioned against the side of the batting layer which is adjacent the structure when the blanket is mounted thereto;

a cover surrounding said batting layer and said frame; and fasteners mounted on said frame and extending outward from said cover.

* * * * *